J. WHITEHEAD.
Cake-Cutter.
No. 200,958.  Patented March 5, 1878.
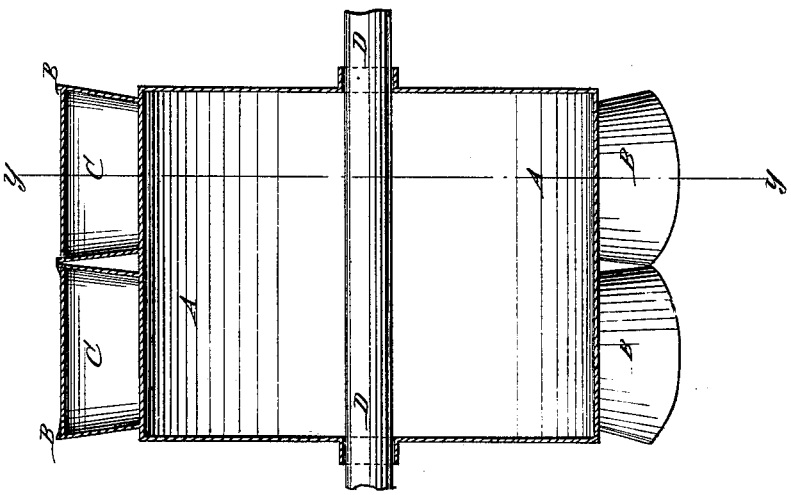
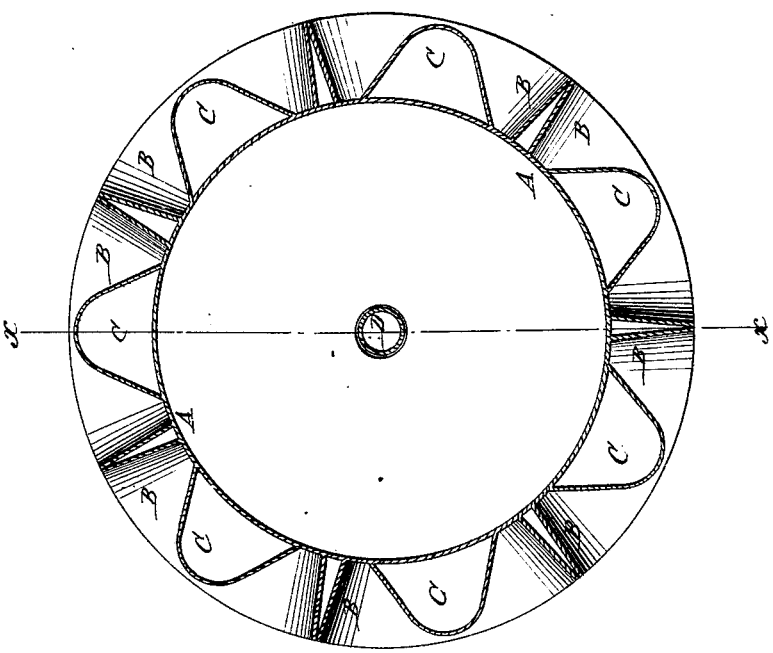
WITNESSES:
INVENTOR:
J. Whitehead
BY
ATTORNEYS.

ized shape, so as to cut the dough into the required shape for the rolls, substantially in the manner and for the purpose set forth.

UNITED STATES PATENT OFFICE.

JESSUP WHITEHEAD, OF CENTRAL CITY, COLORADO.

IMPROVEMENT IN CAKE-CUTTERS.

Specification forming part of Letters Patent No. 200,958, dated March 5, 1878; application filed September 22, 1877.

*To all whom it may concern:*

Be it known that I, JESSUP WHITEHEAD, of Central City, in the county of Gilpin and State of Colorado, have invented a new and Improved French-Roll Molder, of which the following is a specification:

In the accompanying drawings, Figure 1 represents a vertical longitudinal section of my improved French-roll molder on line $y\,y$, Fig. 2; and Fig. 2 is a vertical transverse section of the same on line $x\,x$, Fig. 1.

Similar letters of reference indicate corresponding parts.

This invention relates to a culinary utensil designed to save time and labor in the process of making the kinds of fancy breads used in all hotels, and known as French rolls, Vienna rolls, and others that are made similar to these rolls, so as to part open in the middle when baked.

The invention consists of a number of cutters of peculiar shape, set upon the outside of a cylinder, turning on a central handle, so that the whole instrument may be rolled over a sheet of dough prepared for the purpose, to cut and stamp out portions of the dough in the size and shape required for French rolls.

By referring to the drawings, A represents a cylinder, that turns in the well-known manner on a central handle, D, projecting at both sides of the same. Around the circumference of the cylinder are arranged a number of cutters, B, of oval or other shape, and of a size to correspond to the size of the rolls to be made thereby. The cutters B are arranged with flaring sides, being widest at the outer edge.

The cutters B are provided with a lateral division or bridge, C, across the middle of each cutter, which bridge is soldered or otherwise fastened to the sides, so as to form part of the cutter.

The bridge C is of wedge shape, the blunt, rounded-off, or angular edge being near the cutting-edge of the cutter, and the sides being slanting to the bottom of the cutter, where it is fastened to the cylinder in such a shape that it takes up about half the inside space of the cutter. The rounded-off edge of the bridge is slightly depressed below the edge of the cutter. Both the outer and lower or inside edges of the cutters are so shaped that their outlines describe regular curves, and that a given number of them, placed together at the ends, will form a circle.

Any number of cutters may be arranged on the cylinder, either side by side or according to the size of the cylinder, from about forty or thirty down to four, in which latter case, however, only a portion of the cylinder with a single upright handle would be required.

When the molder is rolled across the dough the edges of the cutter cut the proper size for the rolls, while the bridges make the proper depressions for doubling the two sides of the piece of dough together, cutting them nearly but not quite through. The dough is at the same time pressed up between the flaring sides of the bridges and the flaring sides of the cutters, and forced into the proper rounded or lip shape, as if made by hand, and not as if cut with a common cutter of any kind.

The peculiar form of the cutter and bridge prevents the raising of the dough from the table by the instrument.

By the molder French rolls may be made quicker, at a considerable saving of time, as compared to hand making. The rolls may be made more uniform, and therefore better looking; also, smaller than by hand, which saves a great deal of waste bread.

The molder will also enable many housekeepers to have this kind of rolls upon their table, as by this instrument they may be made easily in every household without the skill and time required to make them by hand.

Having thus described my invention, I claim as new and desire to secure by Letters Patent—

1. A French-roll molder made of a number of cutters arranged on the circumference of a revolving body, said cutters having lateral divisions or bridges, substantially in the manner and for the purpose set forth.

2. A French-roll molder made of a revolving body, arranged with a series of oval or other cutters at the circumference, the cutters having flaring sides and tapering or wedge-shaped bridges, substantially as and for the purpose set forth.

3. A French-roll molder having a series of oval cutters arranged on the circumference of a revolving body, the cutters having flaring sides and lateral wedge-shaped bridges, whose top is slightly depressed below the level of the outer edge of the cutters, substantially as specified.

JESSUP WHITEHEAD.

Witnesses:
J. S. UPDEGRAFF,
W. W. TIFFANY.